United States Patent [19]
Smith et al.

[11] Patent Number: 6,074,080
[45] Date of Patent: Jun. 13, 2000

[54] REVERSIBLE TAILLIGHT ASSEMBLY

[75] Inventors: Kenneth R. Smith, Medina; Robert Rush, Amerhost, both of Ohio

[73] Assignee: MTD Products, Inc., Cleveland, Ohio

[21] Appl. No.: 09/159,971

[22] Filed: Sep. 24, 1998

Related U.S. Application Data

[60] Provisional application No. 60/059,807, Sep. 23, 1997.

[51] Int. Cl.⁷ ....................................................... B60Q 1/26
[52] U.S. Cl. .......................... 362/520; 362/541; 362/543; 362/544; 362/549; 362/374; 362/379
[58] Field of Search .................... D26/28, 139; 362/520, 362/541, 543, 544, 549, 374, 375, 433

[56] References Cited

U.S. PATENT DOCUMENTS

| | | | |
|---|---|---|---|
| D. 273,234 | 3/1984 | Luthe et al. | D26/35 |
| D. 276,187 | 10/1984 | Stahel | D26/139 |
| D. 276,376 | 11/1984 | Stahel | D26/139 |
| D. 347,903 | 6/1994 | Paffrath | D26/35 |
| D. 353,054 | 12/1994 | Paffrath | D26/28 |
| D. 387,469 | 12/1997 | Saleen | D26/139 |
| D. 388,200 | 12/1997 | Tomforde et al. | D26/28 |
| 3,941,994 | 3/1976 | Petty et al. | 240/8.1 |
| 4,569,008 | 2/1986 | Creaser | 362/362 |
| 4,644,449 | 2/1987 | Smith-Williams | 362/80 |
| 4,796,165 | 1/1989 | Metti | 362/80 |
| 4,849,861 | 7/1989 | Arima | 362/61 |
| 4,994,942 | 2/1991 | Georgeff | 362/80 |
| 5,180,224 | 1/1993 | Svehaug | 362/255 |
| 5,335,155 | 8/1994 | Hanson et al. | 362/267 |
| 5,519,588 | 5/1996 | Sobeck et al. | 362/61 |

*Primary Examiner*—Sandra O'Shea
*Assistant Examiner*—Anabel Ton
*Attorney, Agent, or Firm*—Emerson & Associates; Roger D. Emerson; Timothy D. Bennett

[57] ABSTRACT

A reversible taillight assembly that can be used on either the right or left side of a vehicle. The taillight assembly includes a lens housing, a bracket, a lens and a spring clip. The lens housing has a parabolic configuration and accepts a lens at either its left or right hand side. The bracket can be used on either the right or left hand side of the vehicle by simply rotating the bracket 180°. The lens fits within the lens housing after removing the portion of the front face of the lens housing depending upon which side the assembly is attached to. A method for reversing the taillight assembly is also provided. The method contains the steps of rotating the taillight fixture 180° about its z-axis, replacing a first lens portion, removing a second lens portion, and placing a lens in the lens housing. The lens will be placed in the hole that remains from the removal of the second lens portion.

18 Claims, 8 Drawing Sheets

REVERSIBLE TAILLIGHT ASSEMBLY

This application claims the benefit of U.S. Provisional Application, Ser. No. 60/059,807, filed on Sep. 23, 1997.

BACKGROUND OF THE INVENTION

I. Field of the Invention

This invention relates to reversible taillights for a vehicle, and more particularly to, reversible taillights for a riding lawn mower.

II. Description of the Related Art

Global "tail lights" are used in vehicles for a number of reasons. Among them, is the need to indicate to others the presence of a vehicle in front of them. The taillight assembly typically comprises a light bulb, a mounting fixture and an outer lens cover which covers the bulb for protection purposes. The outer lens is also designed for aesthetic purposes.

On a typical vehicle, the taillights are mounted on the rear left-hand and right-hand sides. Manufacturing of the taillight cover is typically designed so that the left-hand taillight cover is similar to but different than the right-hand tail light. Therefore, the left-hand tail light cannot be used on the right-hand taillight. In other words, they are not interchangeable. This leads to increased assembly, manufacturing, inventory and production costs that ultimately increase the cost of the vehicle.

One known type of taillight assembly is U.S. Pat. No. 4,644,449 to Smith-Williams. Smith-Williams discloses a light bracket provided for mounting taillights on a wide variety of vehicles. The taillight disclosed in the Smith-Williams patent, uses two universal brackets that are mirror images of each other. The Smith-Williams patent requires two universal brackets that are not identical to each other. The taillights of the Smith-Williams patent are not interchangeable.

Another known type of taillight assembly is U.S. Pat. No. 4,796,165 to Metti. Metti discloses a taillight assembly provided for a vehicle body. The taillight assembly is secured to the vehicle body by fasteners. The Metti patent presents the same problem as the Smith-Williams patent, which is that the taillight assembly is not reversible and that two separate taillight assemblies must be made for each vehicle.

Another known type of taillight assembly is U.S. Pat. No. 5,335,155 to Hanson, et al. Hanson, et al discloses a taillight construction comprising an outer housing having an aperture that extends therethrough. The taillight assembly of Hanson, et al has two identical lenses on the taillight assembly. The taillight assembly is reversible on both sides of the vehicle. However, the taillight assembly is only reversible if the taillight assembly is attached vertically to the vehicle. In the Hanson, et al patent, if the taillight assembly was attached horizontally, then reversed, the taillight assembly would be facing backwards.

Another known type of taillight assembly is U.S. Pat. No. 3,941,994 to Petti, et al. Petti, et al discloses a light-mounting member extending outwardly from the fender. The Petti, et al patent has similar problems to the previous related art in that the taillight assembly is not reversible.

The present invention contemplates a new and improved reversible taillight assembly which is simple in design, effective in use, and overcomes the foregoing difficulties and others while providing better and more advantageous overall results.

SUMMARY OF THE INVENTION

In accordance with the present invention, a new and improved taillight assembly for a vehicle is provided which is interchangeable for the left-hand and right-hand side of the vehicle.

In accordance with one aspect of the present invention, a lens housing has two selectively removable lens portions, a front face, and a vertical axis. The lens housing is symmetrical about the vertical axis. The lens housing has a curved, parabolic shape. The lens portions are identical to each other.

In accordance with another aspect of the present invention, a taillight fixture includes two bulb-receiving sockets, a dividing wall, and two chambers. The dividing wall divides the taillight fixture into the two chambers. Each chamber contains a bulb-receiving socket. The bulb-receiving sockets are horizontally aligned with each other.

In accordance with still another aspect of the present invention, the first chamber is smaller than the second chamber, and the chambers are horizontally aligned with each other.

In accordance with yet another aspect of the invention, the taillight assembly may be reversed by rotating the taillight fixture 180° about a z-axis, then replacing a first lens portion, removing a second lens portion, then placing a lens in the lens housing.

An object of the present invention is to provide a reversible taillight assembly which can be used on either the right-hand or left-hand side of a vehicle.

Another object of the present invention is to provide a rear taillight cover that is reversible for a riding lawn mower.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
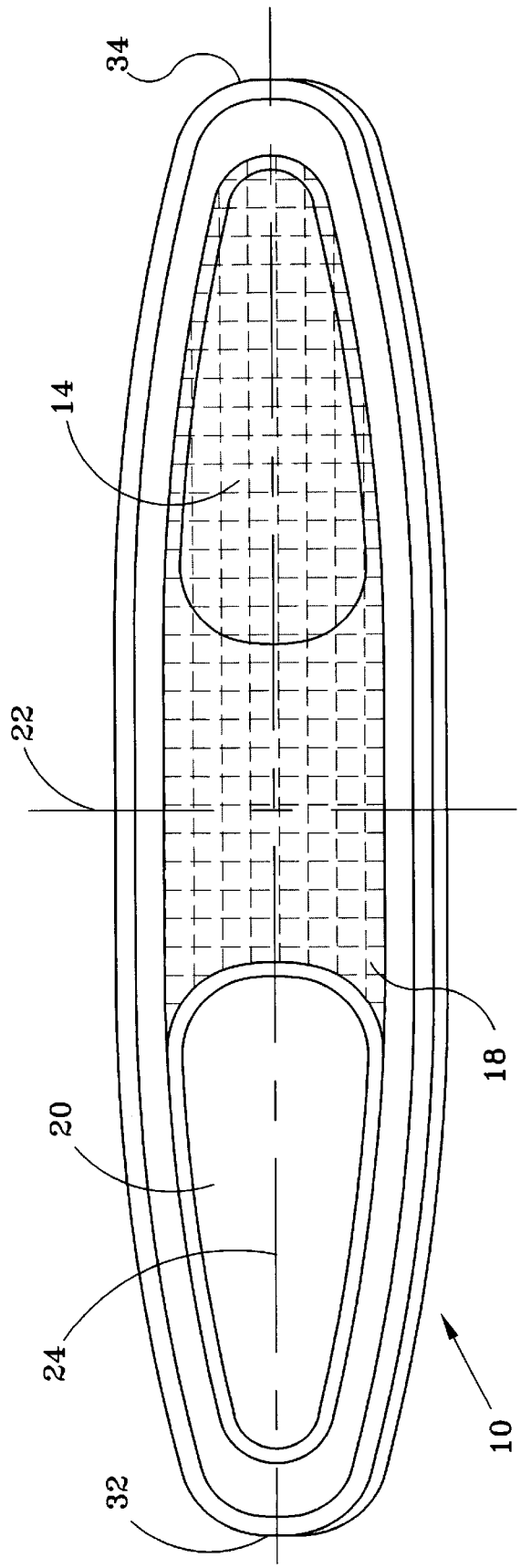
FIG. 1 is a front view of a reversible lens housing showing a lens incorporated on the left side of the present invention.

Referring now to the drawings, which are for purposes of illustrating a preferred embodiment of the invention only, and not for purposes of limiting the invention, FIG. 1 shows a lens housing 10 having a lens 20 incorporated therein. While the invention described herein can be used on any vehicle, it will be described with reference to its preferred embodiment, that being on a riding lawnmower.

Figure 2:
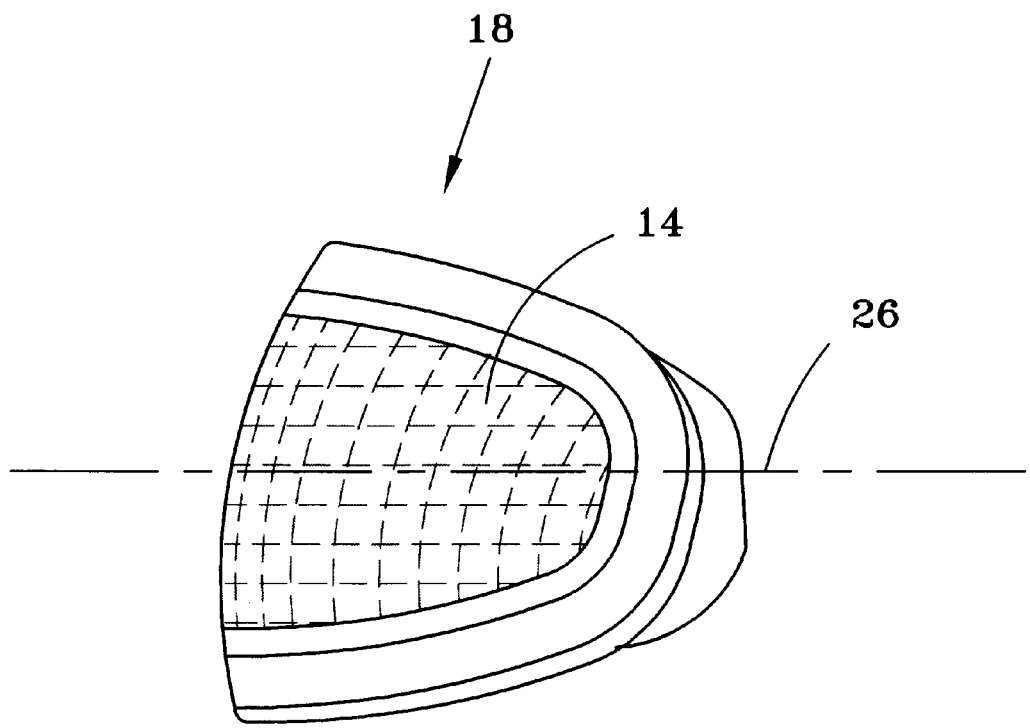
FIG. 2 is a perspective view of the reversible lens housing of the present invention.
Figure 3:
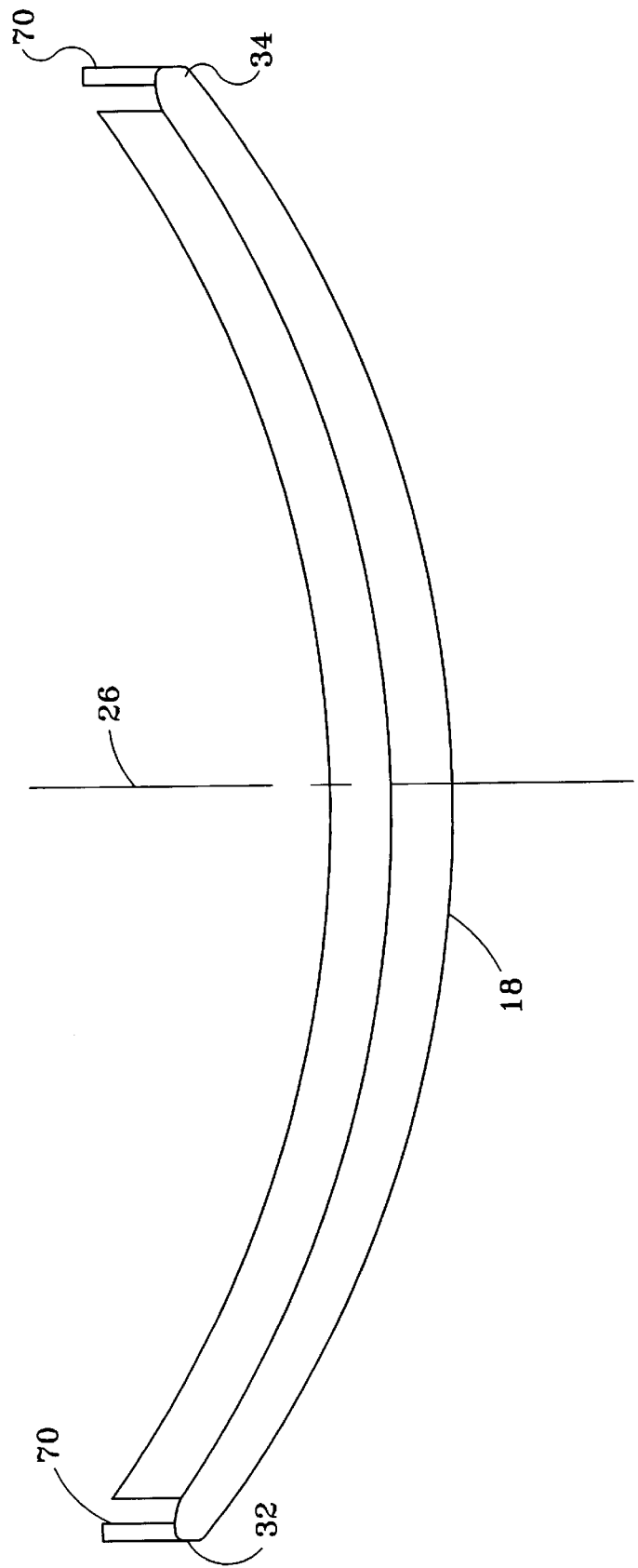
FIG. 3 is a top view of the reversible lens housing of the present invention.
Figure 5:
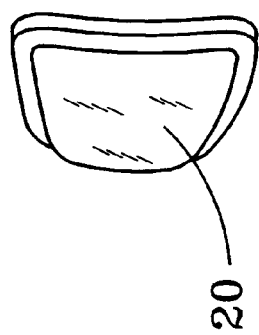
FIG. 5 is a perspective view of the reversible lens of the present invention.
Figure 6:
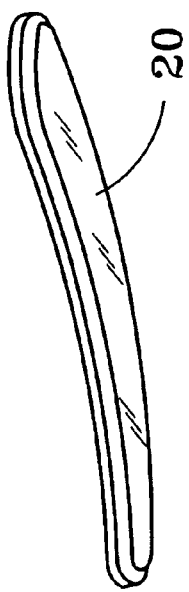
FIG. 6 is a top view of the reversible lens of the present invention.
Figure 4:
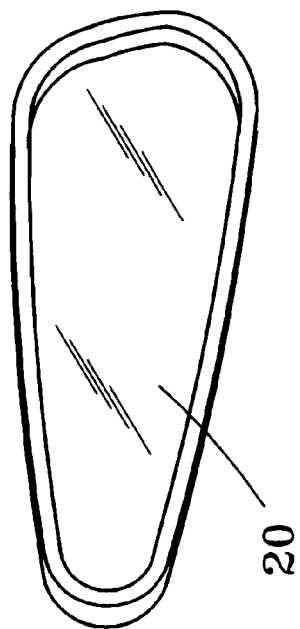
FIG. 4 is a front view of a reversible lens of the present invention.
Figure 8:
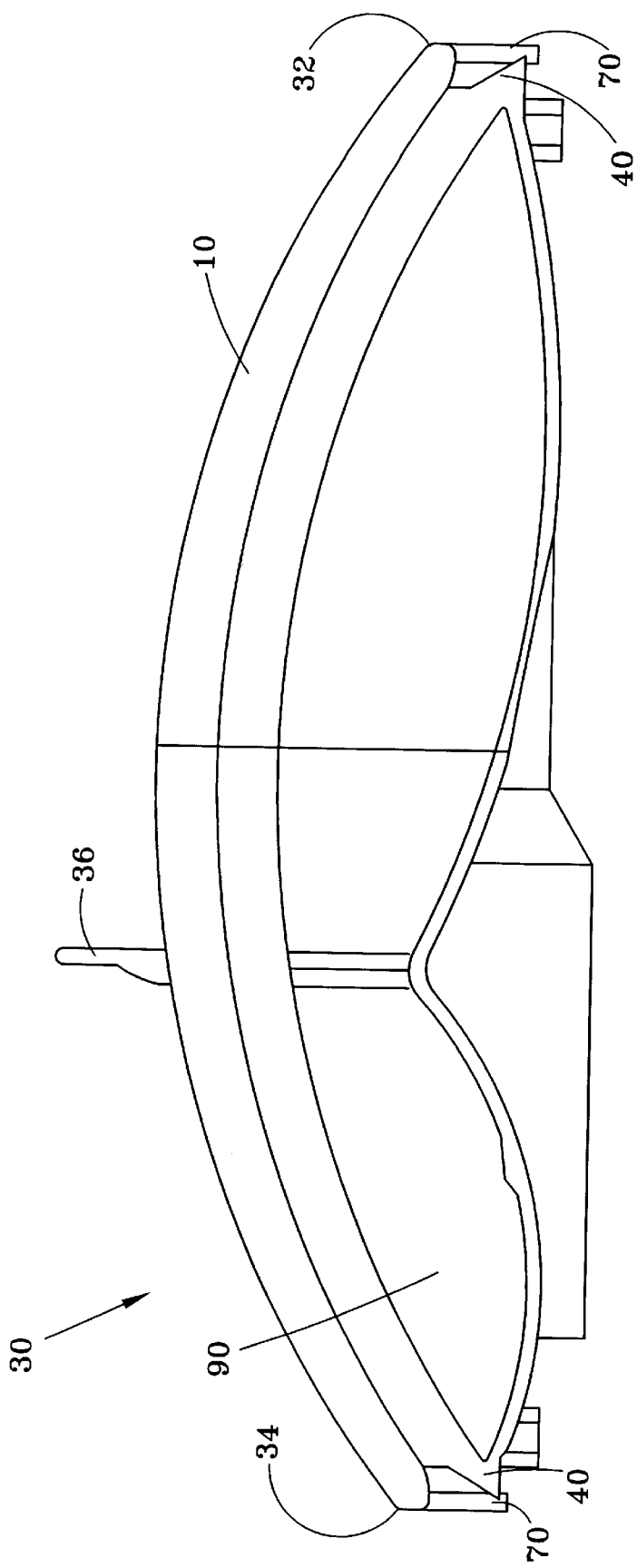
FIG. 8 is a top view of the reversible lens housing installed within the vehicle and showing the spring clip.
Figure 9:
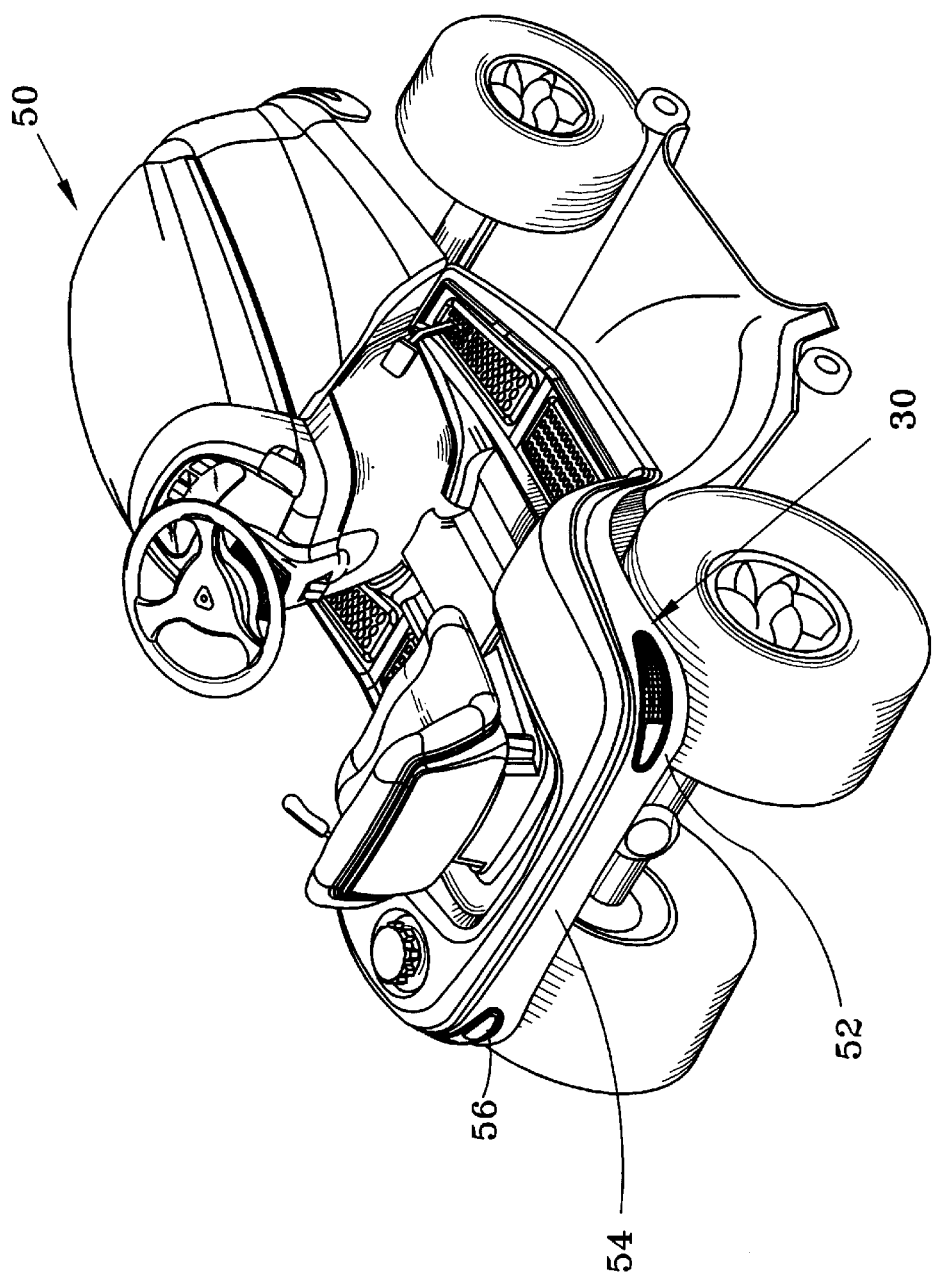
FIG. 9 is a perspective view of a mower having the invention incorporated therein; and, FIG. 10 is a perspective view of the reversible taillight assembly of the present invention.

The lens housing 10, as shown in FIGS. 1–3, is curved in design due to its mounting upon the rear 54 of the mower 50, as shown in FIG. 9. The lens housing 10 is symmetrical about its vertical axis 22. The lens housing 10 can also be described as being parabolic, as shown in FIG. 3. The curved feature of the lens housing 10 is to allow the lens housing 10 to mate with the taillight fixture as shown in FIG. 8.

The lens housing 10 has first and second lens portions 12, 14, respectively, and a front face 18. The first and second lens portions 12, 14 also have a curved, parabolic-shape. The lens housing 10 is manufactured without lens 20 incorporated therein. The lens portions 12, 14 allow the lens 20 to be inserted upon removal of either lens portions 12, 14. The lens 20 is typically used with other components to function as a backup light when the mower 50 is moving in reverse. The lens 20 is typically a different color than that of the front face 18 of the lens housing 10, namely, white, yellow or clear. The lens 20 can be used on either lens portion 12, 14. The lens housing 10 is reversible in that it can be used on either the left or right-hand side of the mower 50. As shown in FIG. 9, the lens housing 10 wraps around the rear corner 52 of the mower 50. FIG. 9 shows the lens housing 10 having the lens 20 incorporated on the left-hand side of the front face 18. The lens 20 is preferably sonically welded to the lens housing 10 prior to mounting upon the mower 50. However, other means are within the scope of this invention.

The lens housing 10 is manufactured having front face 18. Since the lens housing 10 is symmetrical with respect to the vertical axis 22, it can be used on either side of the rear 54 of the mower 50. Where the lens housing 10 is used on the right rear corner 54, as shown in FIG. 9, the left portion 12 of the lens housing 10 is removed. The first portion 12 is easily removed by forcing it out from the lens housing 10. The lens housing 10 is manufactured so that the lens portions 12, 14 can be forcibly removed from the front face 18. The lens 20 is then inserted within the area previously occupied by the first portion 12. The left rear corner 56 will have the identical lens housing 10 and lens 20 incorporated therein. However, the second lens portion 14 will be removed for the right rear corner 52 of the mower 50. Therefore, the lens 20 is reversible and can be used on either the right or left side of the mower 50.

Figure 7:
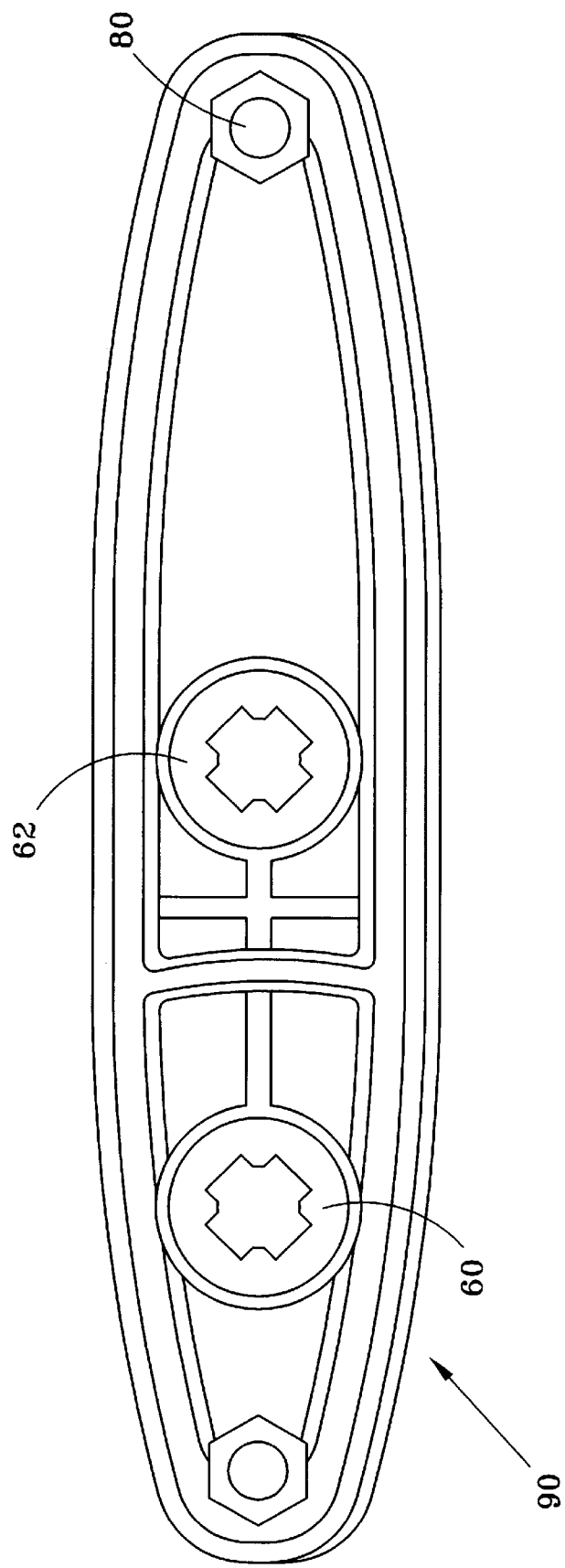
FIG. 7 is a rear view of the reversible lens housing installed within a vehicle.

As shown in FIGS. 7 and 8, the lens housing 10 fits over a taillight fixture 90. A first and second bulb-receiving socket 60, 62 are within the fixture 90 and receive a light bulb (not shown). The fixture 90 can be used on either side of the mower 50, as it is reversible. By rotating the fixture 90 one hundred eighty degrees (180°) around a z-axis 26, the fixture 90 can be used on either the right or left corner 52, 56 of the mower 50. The z-axis 26 is a three dimensional axis, bisecting the horizontal and vertical axes 24, 22. The z-axis 26 goes directly through the front face 18 of the lens housing 10, parallel to the backward extending spring clip 70. The fixture 90 mounts to the mower 50 by attachment means 80. Attachment means 80 are well known within the art and can be a screw, a nut and bolt, etc. Other known attachment means 80 are within the scope of this invention.

FIG. 3 shows a spring clip 70. The spring clip 70 connects the lens housing 10 to the taillight fixture 90. The spring clip 70 extends backwardly from a first and second end 32, 34 of the lens housing 10. The spring clip 70 attaches to the taillight fixture 90 by virtue of a wedge 40 extending off the sides of the taillight fixture 90. The wedges 40 are shown in FIG. 8.

Figure 10:
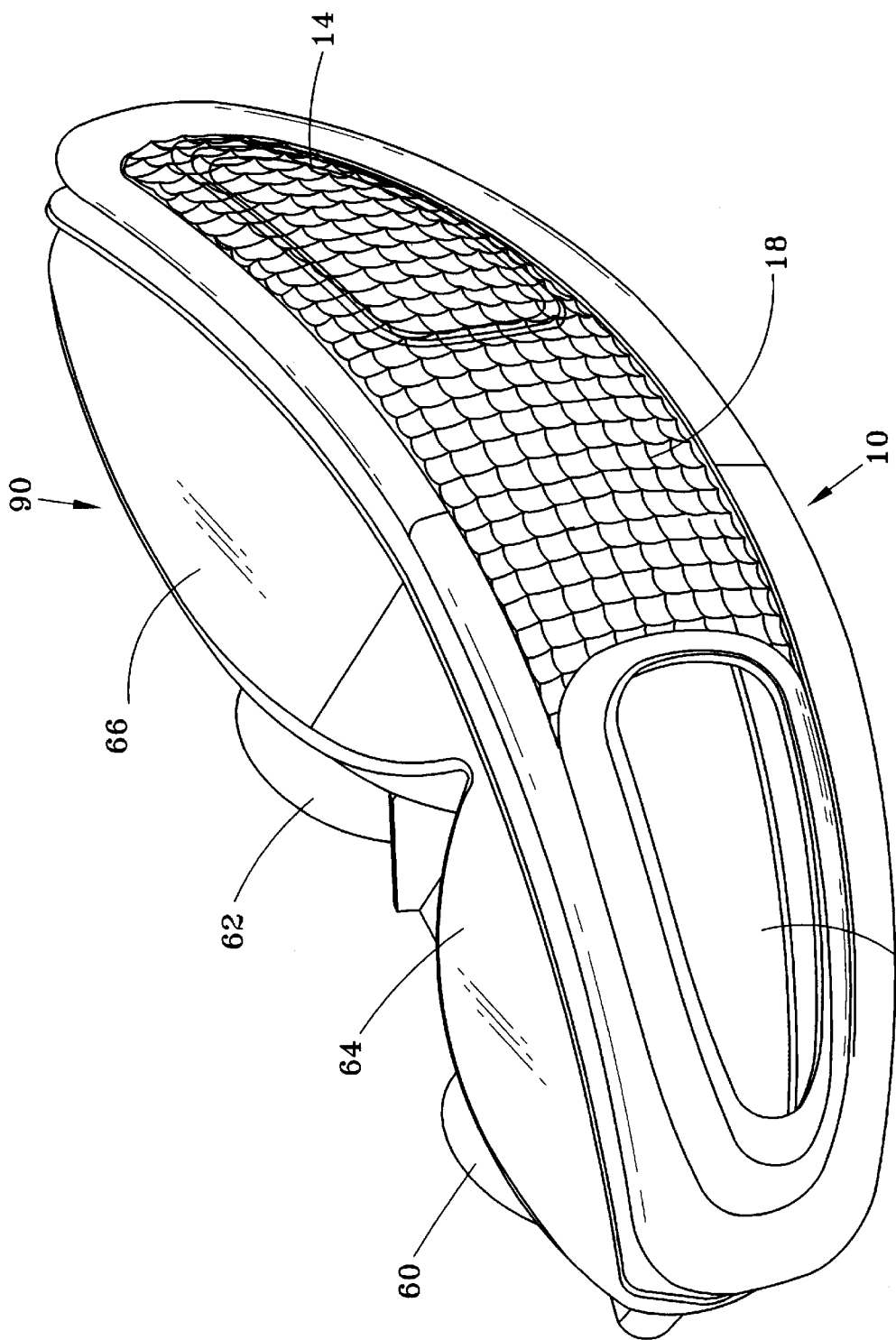

As is shown in FIGS. 8 and 10, the taillight fixture 90 has a dividing wall 36 that divides the taillight fixture 90 into first and second chambers 64, 66. In the preferred embodiment, the dividing wall 36 is between the first and second bulb-receiving sockets 60, 62. As is shown in FIG. 8, the dividing wall 36 is off-center with respect to the taillight fixture 90. As is shown in FIG. 10, the first chamber 64 contains the first bulb-receiving socket 60, and the second chamber 66 contains the second bulb-receiving socket 62. In the preferred embodiment, the first chamber 64 is smaller than the second chamber 66, the chambers 64, 66 being aligned horizontally with each other.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. A lens housing for use with a taillight assembly, the lens housing comprising:

first and second lens portions, the first and second lens portions being selectively removable;

a vertical axis, the lens housing being symmetrical about the vertical axis;

connecting means for connecting the lens housing to the associated taillight fixture; and, a front face.

2. The lens housing of claim 1, wherein the first and second lens portions are curved.

3. The lens housing of claim 2, wherein the first lens portion is curved substantially similar to the second lens portion.

4. The lens housing of claim 2, wherein the front face has a curved shape.

5. The lens housing of claim 1, wherein the connecting means for connecting the lens housing to the taillight fixture is a spring clip.

6. A taillight fixture for use with a taillight assembly, the taillight fixture comprising:

an attachment means for attaching taillight fixture to an associated motor vehicle;

first and second bulb-receiving sockets;

a dividing wall, the dividing wall being between the first and second bulb-receiving sockets; the dividing wall forming a vertical axis and, first and second chambers housing the first and second bulb-receiving sockets, the first and second chambers being aligned horizontally, the first and second bulb receiving sockets being asymmetrical about the vertical axis of the taillight fixture.

7. The taillight fixture of claim 6, wherein the first and second bulb-receiving sockets are horizontally aligned with each other.

8. The taillight fixture of claim 6, wherein the dividing wall is off-center with respect to the taillight fixture.

9. The taillight fixture of claim 8, wherein the first chamber contains the first bulb-receiving socket, and the second chamber contains the second bulb-receiving socket.

10. The taillight fixture of claim 9, wherein the first chamber is smaller than the second chamber, the chambers being aligned horizontally with each other.

11. The taillight fixture of claim 10, wherein the taillight fixture has a curved, parabolic shape in accordance with the curved, parabolic shape of the lens housing.

12. The taillight fixture of claim 11, wherein the taillight fixture has receiving means for receiving the spring clips of the lens housing.

13. A taillight assembly for use with an associated motor vehicle, the taillight assembly comprising:

a lens housing, the lens housing having first and second lens portions, the first and second lens portions being selectively removable;

a vertical axis, the lens housing being symmetrical about the vertical axis;

connecting means for connecting the lens housing to a taillight fixture; and, a front face;

a taillight fixture, the taillight fixture having attachment means for attaching the taillight fixture to the associated motor vehicle;

a bulb-receiving socket; and, dividing means for dividing the taillight fixture into first and second chambers; and, a lens.

14. The taillight assembly of claim 13, wherein the lens housing has a curved, parabolic shape.

15. The taillight assembly of claim 14, wherein the first and second lens portions have substantially identical curved, parabolic shapes.

16. The taillight assembly of claim 15, wherein the taillight fixture has a curved, parabolic shape in accordance with the shape of the lens housing.

17. A method for reversing a taillight assembly, so that the taillight assembly from a first side of an associated motor vehicle can be used on a second side of the associated motor vehicle, the method comprising the steps of:

rotating a taillight fixture 180° about a z-axis;

replacing a first lens portion;

removing a second lens portion;

placing a lens in the lens housing; and, connecting the lens housing to the taillight fixture.

18. A taillight assembly for use with an associated riding lawn mower, the taillight assembly comprising:

a lens housing, the lens housing having first and second lens portions, the first and second lens portions being selectively removable, the lens portions having a rounded, oblong shape;

a curved, parabolic shape;

two spring clips for connecting the lens housing to a taillight fixture, the spring clips extending backwardly from left and right ends of the lens housing; and, a front face;

a taillight fixture, the taillight fixture having attachment means for attaching the taillight fixture to the associated riding lawn mower;

receiving means for receiving the spring clips of the lens housing, the receiving means being two wedges;

first and second bulb-receiving sockets, the receiving sockets not be symmetrical about a vertical axis of the taillight fixture, the receiving sockets being horizontally aligned with each other;

a dividing wall, the dividing wall being off-center of the taillight fixture;

first and second chambers created by the dividing wall, the first chamber containing the first bulb-receiving socket, the second chamber containing the second bulb-receiving socket, the first chamber being smaller than the second chamber, the chambers being horizontally aligned with each other; and, a curved parabolic shape in accordance with the curved parabolic shape of the lens housing;

a lens, the lens fitting in the first or second lens portion, the lens having a rounded, oblong shape in accordance with the shape of the first and second lens portions; and, a z-axis, the z-axis being a three-dimensional axis, bisecting a horizontal and a vertical axis, the z-axis going directly through the front face of the lens housing, parallel to the backward extending spring clips.

* * * * *